(12) United States Patent
Asano

(10) Patent No.: US 12,338,781 B2
(45) Date of Patent: Jun. 24, 2025

(54) CANISTER

(71) Applicant: FUTABA INDUSTRIAL CO., LTD., Okazaki (JP)

(72) Inventor: Akira Asano, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 18/764,849

(22) Filed: Jul. 5, 2024

(65) Prior Publication Data

US 2025/0027464 A1    Jan. 23, 2025

(30) Foreign Application Priority Data

Jul. 18, 2023   (JP) ................................ 2023-116771

(51) Int. Cl.
*F02M 25/08*   (2006.01)
*B01D 53/02*   (2006.01)

(52) U.S. Cl.
CPC ......... *F02M 25/0854* (2013.01); *B01D 53/02* (2013.01); *F02M 25/089* (2013.01); *B01D 2259/4516* (2013.01)

(58) Field of Classification Search
CPC ... F02M 25/0854; F02M 25/089; B01D 53/02
See application file for complete search history.

(56) References Cited

U.S. PATENT DOCUMENTS

| | | | |
|---|---|---|---|
| 5,632,808 A | 5/1997 | Hara et al. | |
| 9,249,762 B2 * | 2/2016 | Yamamoto | ......... F02M 25/0854 |
| 2009/0013973 A1 | 1/2009 | Yamasaki | |
| 2009/0320685 A1 | 12/2009 | Yoshida et al. | |
| 2013/0000610 A1 | 1/2013 | Yamamoto et al. | |
| 2013/0263740 A1 | 10/2013 | Mani | |
| 2014/0230796 A1 | 8/2014 | Brock et al. | |
| 2022/0062813 A1 | 3/2022 | Iwamoto | |

(Continued)

FOREIGN PATENT DOCUMENTS

| | | |
|---|---|---|
| JP | H08270513 A | 10/1996 |
| JP | 2009019572 A | 1/2009 |
| JP | 2010007573 A | 1/2010 |

(Continued)

OTHER PUBLICATIONS

Notice of Reasons for Refusal for Japanese Patent Application No. 2023116771, mailed May 7, 2025, 10 pages.

(Continued)

*Primary Examiner* — Kevin A Lathers
(74) *Attorney, Agent, or Firm* — Withrow + Terranova, PLLC; Vincent K. Gustafson

(57) ABSTRACT

A canister includes two or more chambers in which an adsorbent configured to adsorb an evaporated fuel is placed, a case, an inflow port, an atmosphere port, and outflow port. The case forms a main chamber that is one of the two or more chambers. The inflow port and the outflow port are provided to a first end of the main chamber. The case includes at least one reduced part that is a wall-like part forming an area in the main chamber in the vicinity of the first end. In the at least one reduced part, an area of a cross-section of the main chamber orthogonal to flow directions of a fluid is reduced towards the first end.

10 Claims, 3 Drawing Sheets

(56) References Cited

U.S. PATENT DOCUMENTS

2022/0333558 A1  10/2022  Iwamoto
2022/0333559 A1  10/2022  Iwamoto

FOREIGN PATENT DOCUMENTS

| | | |
|---|---|---|
| JP | 5030691 B2 | 9/2012 |
| JP | 2013011249 A | 1/2013 |
| JP | 2013011249 A1 | 1/2013 |
| JP | 2013217243 A | 10/2013 |
| JP | 2016070183 A | 5/2016 |
| JP | 2017031893 A | 2/2017 |
| JP | 2019105255 A | 6/2019 |
| JP | 2019157691 A | 9/2019 |
| JP | 2022040806 A | 3/2022 |
| JP | 2022164344 A | 10/2022 |
| JP | 2022164345 A | 10/2022 |
| KR | 20040017053 A | 8/2005 |

OTHER PUBLICATIONS

Notice of Reasons for Refusal for Japanese Patent Application No. 2023116772, mailed May 7, 2025, 6 pages.

\* cited by examiner

CANISTER

CROSS-REFERENCE TO RELATED APPLICATIONS

This application claims the benefit of Japanese Patent Application No. 2023-116771 filed on Jul. 18, 2023 with the Japan Patent Office, the disclosure of which is incorporated herein in its entirety by reference.

BACKGROUND

The present disclosure relates to a canister.

As disclosed in Japanese Unexamined Patent Application Publication No. 2013-11249, there has been known a canister in which there is arranged, in a line, a first adsorbing chamber adjacent to an atmosphere port for causing the atmosphere to flow in when purging occurs, a second adsorbing chamber, and a spatial chamber located between the first and second adsorbing chambers. In this canister, when air for purging passes through the spatial chamber, its flow velocity decreases. This lengthens a contact time between an adsorbent in the second adsorbing chamber and the air for purging. Consequently, efficiency to desorb an evaporated fuel is improved.

SUMMARY

However, as a result of decrease in the flow velocity of the air for purging due to the spatial chamber, there is a possibility that a flow of the air is stagnant in the main chamber. This is because the main chamber, which is provided with a charge port communicating with a fuel tank and a purge port for discharging the evaporated fuel at the time of purging, has a large volume.

In one aspect of the present disclosure, it is desirable to encourage a fluid flow inside a canister to be smooth.

One aspect of the present disclosure provides a canister configured to be mounted in a vehicle with an engine. The canister comprises two or more chambers, a case, an inflow port, an atmosphere port, and an outflow port. In the two or more chambers, an adsorbent configured to adsorb an evaporated fuel is placed. The case forms a main chamber that is one of the two or more chambers. The inflow port is a part that is provided to a first end of the main chamber and configured to cause the evaporated fuel to flow from a fuel tank of the vehicle into the main chamber. The atmosphere port is configured to be open to atmosphere and provided to an auxiliary chamber that is one of the two or more chambers. The outflow port is a part that is provided to the first end of the main chamber and configured to cause the evaporated fuel adsorbed on the adsorbent to flow out towards the engine by utilizing the atmosphere flowing in through the atmosphere port. The case includes at least one reduced part that is a wall-like part forming an area in the main chamber in a vicinity of the first end. The at least one reduced part is configured such that an area of a cross-section of the main chamber orthogonal to flow directions of a fluid is reduced towards the first end.

In the above-described configuration, the at least one reduced part can improve a fluid flow in the main chamber in the vicinity of the first end. Accordingly, the fluid flow inside the canister can be encouraged to be smooth.

In one aspect of the present disclosure, the at least one reduced part may be a wall-like part forming the area in the main chamber in the vicinity of the first end to which the inflow port is provided. The at least one reduced part may be configured such that the cross-section of the area is reduced towards the inflow port.

In the above-described configuration, the at least one reduced part can improve the fluid flow in the area in the main chamber in the vicinity of the inflow port. Accordingly, the fluid flow inside the canister can be encouraged to be smooth.

In one aspect of the present disclosure, the at least one reduced part may be a wall-like part forming the area in the main chamber in the vicinity of the first end to which the outflow port is provided. The at least one reduced part may be configured such that the cross-section of the area is reduced towards the outflow port.

In the above-described configuration, the at least one reduced part can improve the fluid flow in the area in the main chamber in the vicinity of the outflow port. Accordingly, the evaporated fuel accumulated in the canister can be encouraged to smoothly flow out from the outflow port when the purging occurs and as a result, desorbing capacity is improved.

In one aspect of the present disclosure, there may be provided two or more reduced parts as the at least one reduced part. One reduced part among the two or more reduced parts may be a wall-like part forming the area in the main chamber in the vicinity of the first end to which the inflow port is provided. The one reduced part may be configured such that the cross-section of the area is reduced towards the inflow port. An other reduced part among the two or more reduced parts may be a wall-like part forming the area in the main chamber in the vicinity of the first end to which the outflow port is provided. The other reduced part may be configured such that the cross-section of the area is reduced towards the outflow port.

In the above-described configuration, the fluid flow can be improved in the respective areas in the vicinity of the inflow port and the outflow port. Accordingly, the fluid flow inside the canister can be encouraged to be smooth. Moreover, the evaporated fuel accumulated in the canister can be encouraged to smoothly flow out from the outflow port when the purging occurs, and as a result, the desorbing capacity is improved.

In one aspect of the present disclosure, the at least one reduced part may include a tilting portion with respect to the flow directions. The tilting portion may surround the area in the main chamber in the vicinity of the first end.

In such a configuration, the at least one reduced part can further improve the fluid flow in the main chamber in the vicinity of the first end. Accordingly, the fluid flow inside the canister can be encouraged to be smoother.

In one aspect of the present disclosure, the at least one reduced part may linearly extend in an axial cross-section containing an axis that passes through the first end to which the at least one reduced part is provided and extends along the flow directions.

In the above-described configuration, the at least one reduced part can improve the fluid flow in the area in the main chamber in the vicinity of the first end. Accordingly, the fluid flow inside the canister can be encouraged to be smooth.

In one aspect of the present disclosure, the at least one reduced part may be tapered.

In such a configuration, the at least one reduced part can improve the fluid flow in the main chamber in the vicinity of the first end. Accordingly, the fluid flow inside the canister can be encouraged to be smooth.

In one aspect of the present disclosure, there may be a granular adsorbent placed in the main chamber. There may be provided at least one gap-forming portion having a specific shape in a vicinity of an inner peripheral surface of the at least one reduced part.

Such a configuration easily forms a gap between the at least one gap-forming portion and the granular adsorbent located in the vicinity of the at least one gap-forming portion. Accordingly, ventilation resistance inside the at least one reduced part can be reduced.

In one aspect of the present disclosure, the at least one gap-forming portion may be a plate-like portion protruding from the inner peripheral surface of the at least one reduced part.

Such a configuration easily forms the gap between the at least one gap-forming portion and the granular adsorbent located in the vicinity of the at least one gap-forming portion. Accordingly, the ventilation resistance inside the at least one reduced part can be reduced.

In one aspect of the present disclosure, the at least one gap forming portion may include two or more plate-like portions protruding from the inner peripheral surface of the at least one reduced part. The two or more plate-like portions may be aligned at substantially fixed intervals so as to circle about an axis. The axis may extend in the flow directions and pass through the inflow port or the outflow port.

The above-described configuration easily forms the gap between the at least one gap-forming portion and the granular adsorbent located in the vicinity of the at least one gap-forming portion. Accordingly, the ventilation resistance inside the at least one reduced part can be reduced.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
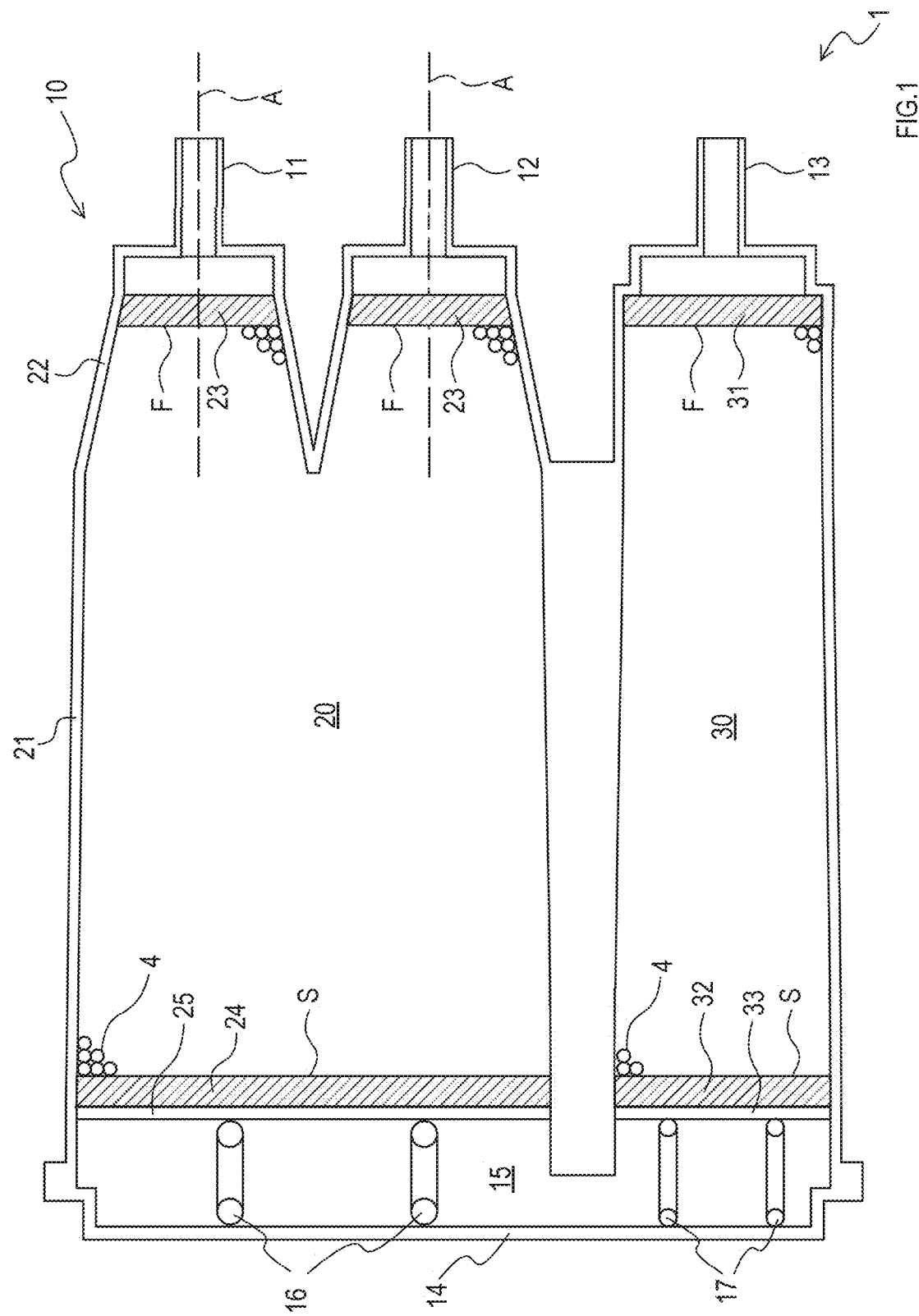
FIG. 1 is a sectional view of a canister along flow directions of a fluid.

Embodiments of the present disclosure are not limited to embodiments to be described below, and can be variously modified within the technical scope of the present disclosure.

1. Configuration of Canister

There is provided a canister 1 in the present embodiment. The canister 1 is mounted in a vehicle (see, FIG. 1). The canister 1 includes a case 10 that forms an outer peripheral surface of the canister 1 and is made of resin. There are provided a main chamber 20 and an auxiliary chamber 30 inside the case 10. In these chambers, an adsorbent 4 is placed so as to adsorb an evaporated fuel. It should be noted that the number of chambers in the canister 1 may be, for example, three or more.

Examples of the adsorbent 4 may include activated carbon in the granular or powdered form, an aggregate of fibrous activated carbon, and a honeycomb carbon containing activated carbon. Furthermore, the adsorbent 4 is not limited to the activated carbon, and may be made from various materials that can adsorb the evaporated fuel.

At an end of the case 10, there are provided an inflow port 11, an outflow port 12, and an atmosphere port 13. Hereinafter, a side of the case 10 of the canister 1 on which the inflow port 11, the outflow port 12, and the atmosphere port 13 are provided is referred to as "port side". The case 10 includes an opening on an opposite side to the port side. The opening is closed by a lid 14. Hereinafter, the opposite side (in other words, a side on which the lid 14 is provided) to the port side is referred to as "lid side".

2. Main Chamber

The main chamber 20 includes a space that has a substantially rectangular parallelepiped shape extending from the port side towards the lid side. The main chamber 20 is provided with, at an end on the port side (hereinafter, "first end F"), the inflow port 11 and the outflow port 12 (see, FIG. 1) that connect the main chamber 20 and the outside of the canister 1. It should be noted that the shape of the space inside the main chamber 20 is not limited to the substantially rectangular parallelepiped shape, and may be a substantially cylindrical shape, for example. Furthermore, the main chamber 20 is connected to a communicating path 15 at an end on the lid side (hereinafter, "second end S") thereof. In the main chamber 20, the evaporated fuel and the below-described purge air (hereinafter, also referred to as "fluid") flow along directions in which the first end F and the second end S face each other. The main chamber 20 is formed with the case 10, and comprises a main part 21 and two reduced parts 22.

The main part 21 extends from the second end S of the main chamber 20 towards the port side, and is a wall-like part that laterally surrounds the main chamber 20.

The two reduced parts 22 extend from an end on the port side of the main part 21 towards the port side, and are wall-like parts forming the main chamber 20. Each reduced part 22 is configured such that an area of a cross-section (hereinafter, "orthogonal cross-section") of the main chamber 20 orthogonal to flow directions of a fluid is reduced towards the port side (in other words, towards the first end F). The respective two reduced parts 22 are provided so as to correspond to a vicinity of the inflow port 11 and a vicinity of the outflow port 12. Each reduced part 22 laterally surrounds an area in the main chamber 20 in the vicinity of the corresponding port. An orthogonal cross-section of the area is reduced towards the corresponding port.

Furthermore, the two reduced parts 22 are arranged in an aligned manner at the end on the port side of the main part 21 in a direction orthogonal to the flow directions of the fluid, and more specifically, along a direction in which the main chamber 20 and the auxiliary chamber 30 are aligned. The first end F of the main chamber 20 consists of respective ends on the port side of the two reduced parts 22. The respective ends of the two reduced parts 22 (in other words, the respective first ends F) are provided with the inflow port 11 and the outflow port 12.

Each first end F of the main chamber 20 is provided with a filter 23; and there is arranged a filter 24 at the second end S. Between the two filters 23 on the port side and the filter 24 on the lid side, the adsorbent 4 is placed. Between the filter 24 on the lid side and the communicating path 15, there is arranged a porous plate 25 having permeability. Between the porous plate 25 and the lid 14, there is arranged a coil spring 16. The coil spring 16 presses the porous plate 25 towards the port side.

3. Auxiliary Chamber

The auxiliary chamber 30 is adjacent to the main chamber 20. The auxiliary chamber 30 has a smaller volume than that of the main chamber 20. The auxiliary chamber 30 has an elongated cylindrical shape extending from the lid side to the port side (see, FIG. 1). It should be noted that the shape of the auxiliary chamber 30 is not limited to be cylindrical, and may be in the form of a prism, for example. At an end on the port side (hereinafter, "first end F") of the auxiliary chamber 30, there is provided the atmosphere port 13 that connects the auxiliary chamber 30 and the outside of the canister 1. There are arranged filters 31 and 32, respectively, at the first end F and an end on the lid side (hereinafter, "second end S") of the auxiliary chamber 30. Between the filters 31 and 32, the adsorbent 4 is placed. Furthermore, the second end S of the auxiliary chamber 30 is connected to the communicating path 15. Between the filter 32 on the lid side and the communicating path 15, there is arranged a porous plate 33. As in the main chamber 20, the porous plate 33 is pressed towards the port side with a coil spring 17 located between the porous plate 33 and the lid 14.

The communicating path 15 is arranged along the lid 14, and connects the main chamber 20 and the auxiliary chamber 30. Therefore, a fluid can travel back and forth inside the canister 1 between the main chamber 20 and the auxiliary chamber 30 via the communicating path 15.

As in the main chamber 20, the fluid flows in the auxiliary chamber 30 along directions in which the first end F and the second end S face each other.

4. Port

The inflow port 11 is connected to a fuel tank of an engine of the vehicle (see, FIG. 1). The evaporated fuel originating in the fuel tank flows into the canister 1 via the inflow port 11, and is adsorbed on the adsorbent 4 in each chamber. Consequently, fuel is accumulated inside the canister 1.

The outflow port 12 is connected to an intake pipe of the engine of the vehicle; and the atmosphere port 13 communicates with the outside of the vehicle, and is open to the atmosphere. Negative intake air pressure of the engine causes atmospheric air (in other words, purge air) to flow into the canister 1 via the atmosphere port 13. Such inflow of the purge air causes the evaporated fuel adsorbed on the adsorbent 4 to be desorbed, and the desorbed evaporated fuel flows out together with the purge air through the outflow port 12 towards the intake pipe. In this way, purging to remove the evaporated fuel adsorbed on the adsorbent 4 is carried out, and the adsorbent 4 is recovered.

5. Details of Reduced Part(s)

Each reduced part 22 is arranged adjacent to the first end F, and formed into a tapered shape in one example (see, FIG. 1). Specifically, an orthogonal cross-section of each reduced part 22 has a substantially circular shape. Needless to say, the orthogonal cross-section of the reduced part 22 may have a shape different from the substantially circular shape such as a substantially oval shape and a substantially polygonal shape. Furthermore, each reduced part 22 has an axial cross-section that tilts with respect to the flow directions of the fluid so as to come closer to an axis A towards the port side, and extends linearly. A portion (tilting portion) of the reduced part 22 tilting with respect to the flow directions of the fluid surrounds an area in the main chamber 20 in the vicinity of the first end F to which the reduced part 22 is provided. It should be noted that the axial cross-section means a cross-section that is parallel to and contains the axis A. Moreover, the axis A is an imaginary straight line that passes through the inflow port 11 or the outflow port 12 (in other words, the first end F) corresponding to the reduced part 22 and extends in the flow directions of the fluid.

It should be noted that the reduced part 22 may be provided so as to correspond to only one of the inflow port 11 or the outflow port 12. In this case, an area without the reduced part 22 in the vicinity of the inflow port 11 or the outflow port 12 may be surrounded by a cylindrical part that has an orthogonal cross-section having a substantially fixed shape (in other words, extending substantially linearly).

6. First Modified Example

Figure 2:
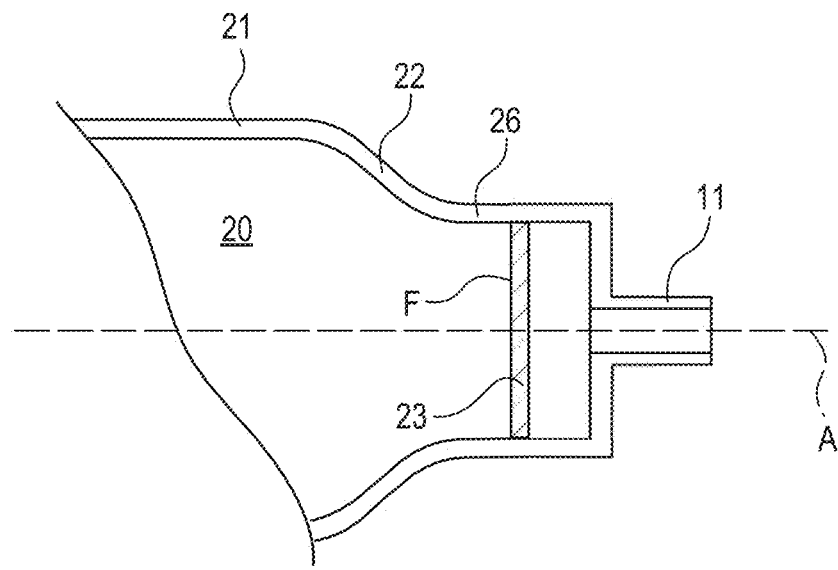
FIG. 2 is a sectional view of a reduced part according to a first modified example along the flow directions of the fluid.

The reduced part 22 may be located at a position apart from the first end F to which the inflow port 11 and the outflow port 12 are provided (see, FIG. 2). Specifically, for example, there may be provided the reduced part 22 and a linear part 26 in the vicinity of the first end F.

The reduced part 22 is tapered, and its respective ends on the lid side and the port side are formed to be round in one example.

The linear part 26 is a part extending along the flow directions of the fluid in the axial cross-section. That is, the linear part 26 has a cylindrical shape extending substantially linearly. The linear part 26 has a substantially fixed orthogonal cross-section, and the orthogonal cross-section of the linear part 26 has substantially the same shape as an end face forming the first end F of the main chamber 20. Furthermore, the linear part 26 extends from the first end F towards the lid side, and the reduced part 22 is provided at an end on the lid side of the linear part 26. An end on the lid side of the reduced part 22 is connected to the main part 21.

Figure 3:
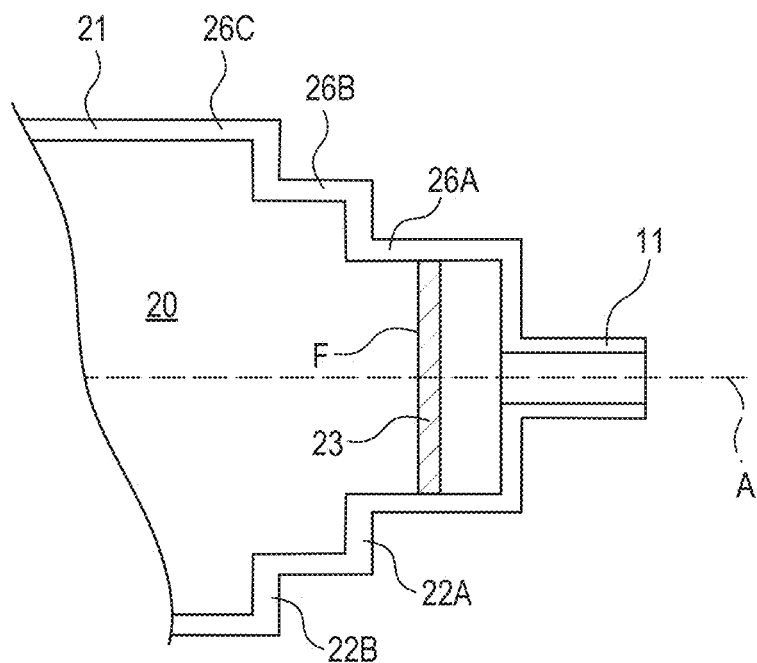
FIG. 3 is a sectional view of the reduced part according to the first modified example along the flow directions of the fluid.

Furthermore, the shape of the reduced part 22 is not limited to be tapered, and may be suitably determined. Furthermore, there may be provided two or more reduced parts 22 in the vicinity of the first end F. Specifically, as illustrated in FIG. 3 as one example, reduced parts 22A and 22B may be parts in the form of steps that expand in a direction substantially orthogonal to the flow directions of the fluid. That is, the reduced parts 22A and 22B may tilt at substantially 90-degree angle with respect to the flow directions of the fluid.

As illustrated in FIG. 3, there may be provided the two reduced parts in the form of steps, i.e., the first and second reduced parts 22A and 22B, and first to third linear parts 26A to 26C in the vicinity of the first end F. Specifically, the first linear part 26A is arranged so as to extend towards the lid side from the first end F of the main chamber 20, and the first reduced part 22A is arranged at an end on the lid side of the first linear part 26A. Furthermore, the second linear part 26B is arranged so as to extend towards the lid side from an end on an outer circumferential side of the first reduced part 22A, and the second reduced part 22B is arranged at an end on the lid side of the second linear part 26B. Still further, the third linear part 26C is arranged so as to extend towards the lid side from an end on an outer circumferential side of the second reduced part 22B, and the third linear part 26C is connected to the main part 21 at an end on the lid side thereof.

7. Second Modified Example

Figure 4:
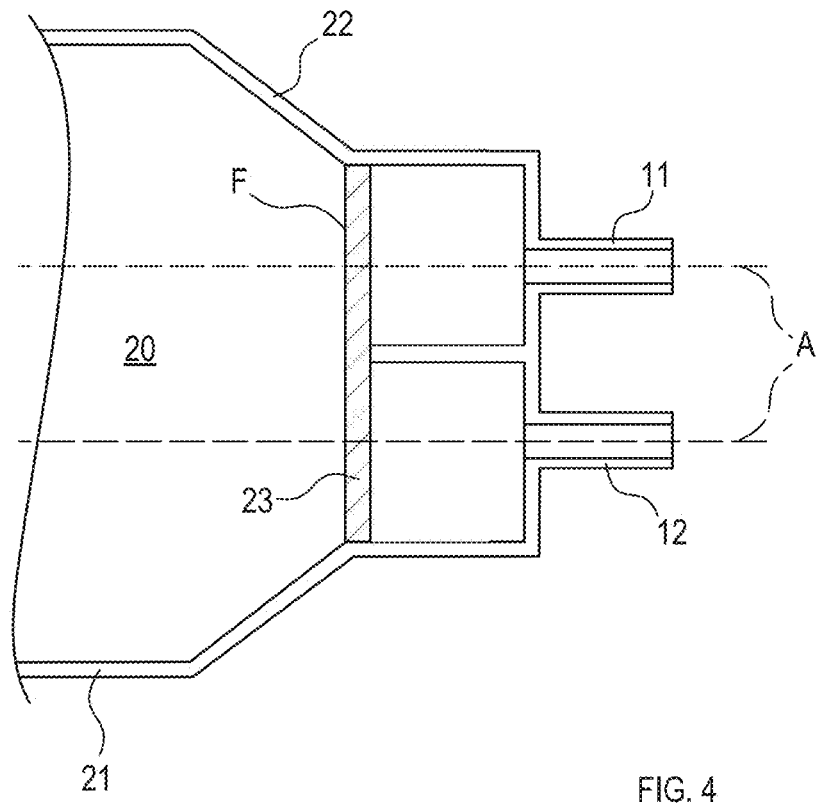
FIG. 4 is a sectional view of a reduced part according to a second modified example along the flow directions of the fluid.

The reduced part 22 may be provided so as to correspond to the inflow port 11 and the outflow port 12 (see, FIG. 4). That is, the main chamber 20 may be provided with one reduced part 22, and the one reduced part 22 may be arranged so as to extend towards the lid side from one first end F of the main chamber 20 to which the inflow port 11 and the outflow port 12 are provided.

In FIG. 4, the reduced part 22 is tapered in one example, and is arranged adjacent to the first end F. However, the shape, the location, and the number of the reduced part(s) 22 may be suitably determined. Specifically, as in the first modified example, the reduced part 22 may be provided apart from the first end F, and may be in the form of a step. Furthermore, as in the first modified example, there may be provided the two or more reduced parts 22 together with the linear part(s) in the vicinity of the first end F.

8. Third Modified Example

In a state where the adsorbent 4 in the granular form is placed in the main chamber 20, there may be provided at least one gap-forming portion having a specific shape in the vicinity of an inner peripheral surface of the reduced part 22. It should be noted that the adsorbent 4 in the granular form may be, for example, a pellet made from granular activated carbon. The pellet may have various shapes such as a substantially cylindrical shape and a spheroidal shape. Furthermore, in a case where the main chamber 20 is provided with the two reduced parts 22, the gap-forming portion can be provided to both or one of the two reduced parts 22.

Figure 5:
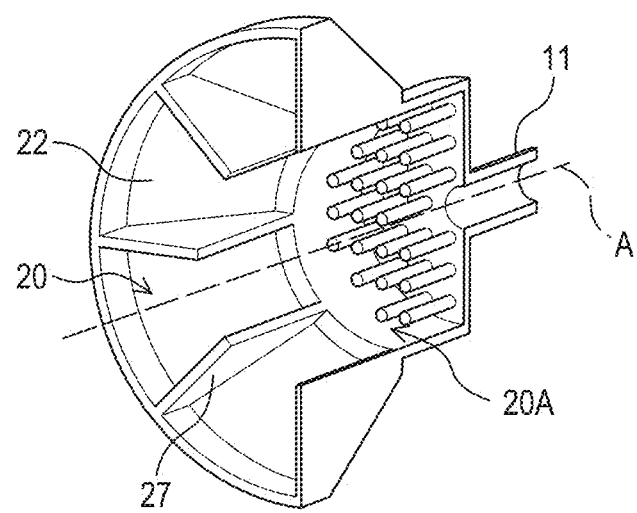
FIG. 5 is a sectional perspective view of a reduced part according to a third modified example along the flow directions of the fluid.

Specifically, as illustrated in FIG. 5 as one example, two or more gap-forming portions 27 may be arranged so as to protrude from the inner peripheral surface of the reduced part 22 in the tapered form towards the axis A of the port adjacent to the reduced part 22. Each gap-forming portion 27 extends along the flow directions of the fluid, and has, in one example, a rectangular shape in a cross-section orthogonal to the flow directions of the fluid. That is, each gap-forming portion 27 has a plate-like shape. Furthermore, the two or more gap-forming portions 27 are aligned at substantially fixed intervals so as to circle about the axis A. Still further, the two or more gap-forming portions 27 are made of resin as in the reduced part(s) 22 and the case 10, and may be formed integrally with the reduced part(s) 22, and the case 10.

Needless to say, the shape and the mode of arrangement of each gap-forming portion 27 is suitably determined. Specifically, for example, each gap-forming portion 27 may be a rib-like portion that protrudes from the inner peripheral surface of the reduced part 22 and extends along the flow directions of the fluid. Furthermore, each gap-forming portion 27 may, for example, extend in a direction different from the flow directions of the fluid. Still further, each gap-forming portion 27 may be a rod-like portion protruding from the inner peripheral surface of the reduced part 22. The two or more gap-forming portions 27 may be provided at specific locations in the inner peripheral surface without circling around the axis A.

In a case where the linear part 26 is arranged adjacent to the reduced part 22, each gap-forming portion 27 may be arranged so as to extend across the reduced part 22 and the linear part 26.

Each gap-forming portion 27 includes a top extending along a boundary to a front area 20A. It should be noted that the front area 20A means an area in the main chamber 20 that extends along the flow directions of the fluid towards the lid side from the end face forming the first end F to which the inflow port 11 or the outflow port 12 is provided. The front area 20A is a columnar area having substantially the same shape as the end face in a cross section orthogonal to an extending direction of the front area 20A. Needless to say, the shape of the top of each gap-forming portion 27 is not limited hereto, and can be suitably determined.

The two or more gap-forming portions 27 may be formed as separate members from the reduced part 22. Specifically, the two or more gap-forming portions 27 may be formed separately from the reduced part 22 and then assembled to the inner peripheral surface of the reduced part 22 or arranged in the vicinity of the inner peripheral surface. In the same manner, the inner peripheral surface of the reduced part 22 may be provided with one gap-forming portion. In the same manner, in the reduced part 22 according to the first and second modified examples, there may be provided one gap-forming portion.

9. Effects (1) In a chamber provided with a port in a canister, an area having a relatively satisfactory fluid flow is considered to expand substantially in the form of a fan from a port along flow directions of a fluid. For this reason, in the chamber in the vicinity of the port, a fluid flow is stagnant in an area in the vicinity of a side wall that laterally surrounds the chamber. Consequently, there is a possibility that the area having a stagnant fluid flow becomes a dead space where adsorption and desorption of an evaporated fuel utilizing an adsorbent are not sufficiently performed.

In contrast, the above-described embodiments can reduce the dead space by providing the first end(s) F of the main chamber 20 with the reduced part(s) 22, and improve the fluid flow in the vicinity of the first end(s) F of the main chamber 20. As a result, the fluid flow inside the canister 1 can be encouraged to be smooth. This improves a capacity to desorb the evaporated fuel adsorbed on the adsorbent (desorbing capacity). Moreover, since the desorbing capacity is improved, even a small quantity of the adsorbent 4 can efficiently accumulate the evaporated fuel and thus, a capacity to adsorb the evaporated fuel (adsorbing capacity) is improved.

(2) Furthermore, in the event of purging, the purge air is considered to have a flow velocity decreasing in the vicinity of the outflow port 12 in the main chamber 20. In contrast, providing the reduced part 22 in the vicinity of the outflow port 12 can inhibit the flow velocity of the purge air from decreasing in the vicinity of the outflow port 12 in the main chamber 20. Therefore, in the event of the purging, the evaporated fuel accumulated in the canister 1 can be encouraged to smoothly flow out from the outflow port 12, and as a result, the desorbing capacity is improved.

(3) Still further, the tilting portion of the reduced part 22 surrounds the area in the main chamber 20 in the vicinity of the first end F to which the corresponding port is provided. Consequently, the fluid flow can be further improved in the main chamber 20 in the vicinity of the first end F. Therefore, the fluid flow inside the canister 1 can be encouraged to be smoother.

(4) Still further, since the reduced part(s) 22 is tapered, the fluid flow in the vicinity of the first end(s) F in the main chamber 20 can be improved. Therefore, the fluid flow inside the canister 1 can be encouraged to be smooth.

(5) Still further, providing the reduced part(s) 22 with the gap-forming portion(s) 27 can form a gap(s) in the vicinity of the gap-forming portion(s) 27 and the adsorbent in the granular form that contacts the gap-forming portion(s) 27. This can reduce ventilation resistance inside the reduced part(s) 22.

10. Other Embodiments (1) In the above-described embodiments, the case 10, which forms an outer peripheral surface of the canister 1, forms the main chamber 20 and the reduced part(s) 22. However, the canister 1 is not limited to such a configuration, and may include an outer case forming the outer peripheral surface thereof and a case arranged inside the outer case as an inner case. Moreover, the case as the inner case may form a main chamber including a reduced part as in the above-described embodiments.

Furthermore, the canister 1 may be provided with two or more main chambers aligned in the flow directions of the fluid. In this case, the reduced part(s) 22 as in the above-described embodiments may be formed in a main chamber adjacent to the inflow port 11 and the outflow port 12.

(2) In the above-described embodiments, the tilting portion of the reduced part 22 with respect to the flow directions of the fluid is formed so as to surround the area in the main chamber 20 in the vicinity of the first end F to which the corresponding port is provided. However, the tilting portion may not surround this area. Specifically, the reduced part may be provided with a tilting portion tilting with respect to the flow directions of the fluid and a non-tilting portion extending substantially linearly along the flow directions of the fluid. Even the reduced part configured in this way can reduce, towards the corresponding port, the orthogonal cross-section of the area in the main chamber 20 surrounded by the reduced part.

(3) Two or more functions performed by a single element in the above-described embodiments may be achieved by two or more elements. A single function performed by a single element may be achieved by two or more elements. Two or more functions performed by two or more elements may be achieved by a single element. A single function performed by two or more elements may be achieved by a single element. Furthermore, a part of the configuration in the above-described embodiments may be omitted. Still further, at least a part of the configuration in the above-described embodiments may be added to or replaced with another configuration of the above-described embodiments.

11. Technical Ideas Disclosed in Present Disclosure

Item 1

1. A canister configured to be mounted in a vehicle with an engine, the canister comprising:
two or more chambers in which an adsorbent configured to adsorb an evaporated fuel is placed;
a case forming a main chamber, the main chamber being one of the two or more chambers;
an inflow port, the inflow port being a part that is provided to a first end of the main chamber and configured to cause the evaporated fuel to flow from a fuel tank of the vehicle into the main chamber;
an atmosphere port configured to be open to atmosphere, the atmosphere port being provided to an auxiliary chamber, and the auxiliary chamber being one of the two or more chambers; and
an outflow port, the outflow port being a part that is provided to the first end of the main chamber and configured to cause the evaporated fuel adsorbed on the adsorbent to flow out towards the engine by utilizing the atmosphere flowing in through the atmosphere port, the case including at least one reduced part that is a wall-like part forming an area in the main chamber in a vicinity of the first end, and
the at least one reduced part being configured such that an area of a cross-section of the main chamber orthogonal to flow directions of a fluid is reduced towards the first end.

Item 2

The canister according to Item 1,
wherein the at least one reduced part is a wall-like part forming the area in the main chamber in the vicinity of the first end to which the inflow port is provided, and
wherein the at least one reduced part is configured such that the cross-section of the area is reduced towards the inflow port.

Item 3

The canister according to Item 1 or 2, wherein the at least one reduced part is a wall-like part forming the area in the main chamber in the vicinity of the first end to which the outflow port is provided, and
wherein the at least one reduced part is configured such that the cross-section of the area is reduced towards the outflow port.

Item 4

The canister according to any one of Items 1 to 3,
wherein the at least one reduced part includes a tilting portion with respect to the flow directions, and
wherein the tilting portion surrounds the area in the main chamber in the vicinity of the first end.

Item 5

The canister according to any one of Items 1 to 4, wherein the at least one reduced part linearly extends in an axial cross-section containing an axis that passes through the first end to which the at least one reduced part is provided and extends along the flow directions.

Item 6

The at least one canister according to any one of Items 1 to 5,
wherein there is a granular adsorbent placed in the main chamber,
wherein there is provided at least one gap-forming portion having a specific shape in a vicinity of an inner peripheral surface of the at least one reduced part.

What is claimed is:
1. A canister configured to be mounted in a vehicle with an engine, the canister comprising:
two or more chambers in which an adsorbent configured to adsorb an evaporated fuel is placed;
a case forming a main chamber with a first end and an opposing second end, the main chamber being one of the two or more chambers and defining a fluid flow direction between the first end and the second end;
an inflow port located at the first end of the main chamber and configured to cause the evaporated fuel to flow from a fuel tank of the vehicle into the main chamber;
an atmosphere port configured to be open to atmosphere, the atmosphere port located at an auxiliary chamber, and the auxiliary chamber being one of the two or more chambers; and
an outflow port located at the first end of the main chamber and configured to cause the evaporated fuel adsorbed on the adsorbent to flow out towards the engine by utilizing atmospheric gas flowing in through the atmosphere port,
wherein the case includes:
a main part extending away from the second end in the fluid flow direction, the main part being formed as a wall-like part that laterally surrounds the main chamber, and
at least one reduced part that is located between the main part and the first end and is formed as a wall-like part surrounding an area in the main chamber in a vicinity of the first end,
wherein the at least one reduced part is configured such that an area of a cross-section of the main chamber orthogonal to the fluid flow direction is reduced towards the first end, and
wherein the at least one reduced part is tilted, with respect to the fluid flow direction of the fluid, greater than the main part is tilted.

2. The canister according to claim 1,
wherein the at least one reduced part is a wall-like part forming the area in the main chamber in the vicinity of the first end to which the inflow port is provided, and
wherein the at least one reduced part is configured such that the cross-section of the area is reduced towards the inflow port.

3. The canister according to claim 1,
wherein the at least one reduced part is a wall-like part forming the area in the main chamber in the vicinity of the first end to which the outflow port is provided, and
wherein the at least one reduced part is configured such that the cross-section of the area is reduced towards the outflow port.

4. The canister according to claim 1, wherein:
the at least one reduced part is two or more reduced parts;
one reduced part among the two or more reduced parts is a wall-like part forming the area in the main chamber in the vicinity of the first end to which the inflow port is provided,
the one reduced part is configured such that the cross-section of the area is reduced towards the inflow port,
an other reduced part among the two or more reduced parts is a wall-like part forming the area in the main chamber in the vicinity of the first end to which the outflow port is provided, and
the other reduced part is configured such that the cross-section of the area is reduced towards the outflow port.

5. The canister according to claim 1, wherein each reduced part of the at least one reduced part:
defines a reduced part axis parallel to the fluid flow direction of the main part, and
has an axial cross section defined in a plane parallel to and including the reduced part axis, the axial cross section extending in a linear manner.

6. The canister according to claim 1, wherein the at least one reduced part is tapered.

7. A canister configured to be mounted in a vehicle with an engine, the canister comprising:
two or more chambers in which an adsorbent configured to adsorb an evaporated fuel is placed;
a case forming a main chamber with a first end and an opposing second end, the main chamber being one of the two or more chambers and defining a fluid flow direction between the first and second ends;
an inflow port located at the first end of the main chamber and configured to cause the evaporated fuel to flow from a fuel tank of the vehicle into the main chamber;
an atmosphere port configured to be open to atmosphere, the atmosphere port located on an auxiliary chamber, and the auxiliary chamber being one of the two or more chambers; and
an outflow port located at the first end of the main chamber and configured to cause the evaporated fuel adsorbed on the adsorbent to flow out towards the engine by utilizing atmospheric gas flowing in through the atmosphere port,
wherein the case includes at least one reduced part that is a wall-like part surrounding an area in the main chamber in a vicinity of the first end,
wherein the at least one reduced part is configured such that an area of a cross-section of the main chamber orthogonal to the fluid flow direction is reduced towards the first end,
wherein there is a granular adsorbent placed in the main chamber,
wherein the canister includes at least one gap-forming portion that is at least one plate-like portion protruding from an inner peripheral surface of the at least one reduced part, and
wherein the at least one gap-forming portion is arranged to contact the adsorbent.

8. The canister according to claim 7,
wherein the at least one gap forming portion includes two or more plate-like portions protruding from the inner peripheral surface of the at least one reduced part,
wherein the two or more plate-like portions are aligned at substantially fixed intervals so as to circle about an axis, and
wherein the axis is parallel to the fluid flow direction and passes through either the inflow port or the outflow port.

9. The canister according to claim 7, wherein the at least one gap-forming portion is a plurality of gap-forming portions.

10. The canister according to claim 7,
wherein the at least one plate-like portion includes at least one surface orthogonal to the fluid flow direction and at least one surface parallel to the fluid flow direction; and
wherein the at least one plate-like portion is arranged to contact the adsorbent on the at least one surface orthogonal to the fluid flow direction and on the at least one surface parallel to the fluid flow direction.

* * * * *